(12) United States Patent
Benway et al.

(10) Patent No.: US 9,247,055 B2
(45) Date of Patent: *Jan. 26, 2016

(54) INTERACTIVE VOICE RESPONSE (IVR) ROUTING SYSTEM

(71) Applicant: Plantronics, Inc., Santa Cruz, CA (US)

(72) Inventors: Evan Harris Benway, Santa Cruz, CA (US); Erik Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,201

(22) Filed: Jun. 3, 2014

(65) Prior Publication Data

US 2015/0350427 A1    Dec. 3, 2015

(51) Int. Cl.
*H04M 1/64* (2006.01)
*H04M 3/493* (2006.01)
*H04M 11/00* (2006.01)

(52) U.S. Cl.
CPC ..................... *H04M 3/493* (2013.01)

(58) Field of Classification Search
CPC .......... H04M 1/274566; H04M 3/493; H04M 2201/14; H04M 2203/2016; H04M 3/4217; H04Q 2213/13377
USPC ........................... 379/88.01–88.19
See application file for complete search history.

(56) References Cited

U.S. PATENT DOCUMENTS

| 6,104,790 | A  | * | 8/2000  | Narayanaswami | H04M 1/2471 379/93.17 |
|---|---|---|---|---|---|
| 7,127,487 | B1 | * | 10/2006 | Wang          | H04L 12/1822 709/204  |
| 8,515,028 | B2 |   | 8/2013  | Berger et al. |                       |
| 2002/0143655 | A1 | * | 10/2002 | Elston   | G06Q 20/02 705/26.81  |
| 2009/0154666 | A1 | * | 6/2009  | Rios     | G06F 3/04895 379/88.18 |
| 2013/0230154 | A1 | * | 9/2013  | Wilson   | H04M 3/5166 379/88.01 |
| 2013/0301821 | A1 | * | 11/2013 | Gilzean  | H04M 3/493 379/201.01 |
| 2014/0314225 | A1 | * | 10/2014 | Riahi    | H04M 3/5235 379/265.09 |

OTHER PUBLICATIONS

Perotti, et al., "Automated Traversal of Interactive Voice Response Systems," U.S. Utility U.S. Appl. No. 14/169,019, filed Jan. 30, 2014, 38 pages.

Benway et al., "System and Method for Creating Interactive Voice Response (IVR) Dialers," Utility U.S. Appl. No. 14/201,549, filed Mar. 7, 2014, 69 pages.

* cited by examiner

*Primary Examiner* — Solomon Bezuayehu
(74) *Attorney, Agent, or Firm* — Thomas L. Ewing (57) ABSTRACT

An interactive voice response method and system is described. A computerized IVR dialer signals to an IVR system that it is capable of high speed operations. The IVR system completes the high speed operations handshake with the IVR dialer. The two IVR components then continue processing of the IVR call at speeds higher than likely obtainable in a conventional IVR call, e.g., one in which the IVR dialer is performed by a human caller. The IVR system and the IVR dialer may employ a high speed IVR script that eliminates many of the instructional messages provided to human IVR callers and also eliminates or reduces the duration of pauses between the communication of information.

28 Claims, 3 Drawing Sheets

| | 500 |
|---|---|
| High Speed Access Code | 4449555 |
| Code Provided Within | 10 seconds of initiation |
| Min. HS pause time | 0.5 seconds |
| Reg. Menu Alterations | None; Reverse |

FIG. 5

INTERACTIVE VOICE RESPONSE (IVR) ROUTING SYSTEM

REFERENCE TO CO-PENDING APPLICATIONS

This application is related to co-pending U.S. patent application Ser. No. 14/169,019, filed Jan. 30, 2014, titled "Automatic Traversal of Interactive Voice Response Systems," and to co-pending U.S. patent application Ser. No. 14/201,549, filed Mar. 7, 2014, titled "System and Method for Creating Interactive Voice Response (IVR) Dialers." These related applications are incorporated herein by reference in their entireties.

FIELD

Embodiments of the invention relate to systems and methods providing interactive voice response ("IVR") functions and services. More particularly, an embodiment of the invention relates to systems and methods that facilitate IVR authentication and routing systems.

BACKGROUND

Interactive voice response ("IVR") systems allow computers to interact with humans by using input means such as voice and DTMF tones. IVR systems typically provide verbal information to the user, and the user typically provides a verbal and/or a DTMF response to queries from the IVR system, depending on the configuration of the IVR system.

IVR systems are used commonly as customer support tools. IVR systems allow customers to interact with a company's customer interaction computing system (e.g., for functions such as obtaining bank balances and finding flight arrival times) via a telephone keypad and/or by speech recognition which allows users to service their own inquiries by following the menu and/or script provided by the IVR system. IVR systems deployed in a network are typically sized to handle large call volumes, e.g., handling all the flight schedule queries for an international airline. IVR technology is also being introduced into automobile systems for hands-free operation. Current deployment in automobiles involves satellite navigation, audio and mobile phone systems.

IVR systems typically interact with users by employing prerecorded or dynamically generated audio scripts that instruct users how to proceed in completing the specific functional task(s) that the user is trying to accomplish. IVR systems can be used to provide most functions where the interface can be broken down into a series of relatively simple interactions for the user to follow. Conventional IVR systems tend to be customized for specific companies and applications while typically residing in a framework that is generally ubiquitous across all systems.

While IVR systems have roots going back to at least the 1970s, computerized IVR systems began seeing widespread commercial success in the 1980s. IVR systems proved to be cheaper and equally reliable, if not more reliable, than using human operators for handling many customer tasks. IVR systems provided great improvements over operator-driven systems from the past, but the new area of computerized mobile communications—both smartphones and softphones on operating computers—provides opportunities to make the legacy IVR systems function even more efficiently, as users have the potential for being able to complete functional tasks using IVR systems without having the necessity for spending any time themselves engaging in telephone conversation with the IVR—apart from the possibility of spending a minimal amount of time entering some very user-specific information or from speaking with an operator associated with the website regarding a task not yet scripted by the IVR system.

Since IVRs have been architected for a pre-mobile phone, pre-smartphone generation, they often fail while performing complicated tasks at high speeds. The lost industrial productivity from workers being placed on hold while trying to conduct operations on an IVR system is tremendous, and overall productivity would likely increase if the functional tasks performed using IVR systems could be automated still further. In addition, IVR systems that engage with a customer longer than necessary causes an unnecessary cost to the organization hosting the IVR. A simple and robust solution is called for that makes IVR systems and customized IVR systems more ubiquitous, easier to provide high speed operations, and easier to maintain.

Attempts to solve these problems in the prior art have tended to be either overly complicated, overly expensive, or both. To further complicate matters, many corporations outsource to third party vendors sizeable aspects of their IVR system operations which complicates the process of developing tailored high speed IVR systems for a given corporation since so many aspects of the IVR systems are unique to the specific IVR system and its customer.

IVR systems provide great improvements over operator-driven systems from the past, but the new area of computerized mobile communications—both smartphones and softphones operating on computers—provides opportunities to make legacy IVR systems function more efficiently, as users have the potential for being able to complete functional tasks using IVR systems without having the necessity for spending any time themselves engaging in telephone conversation with the IVR—apart from the possibility of spending a minimal amount of time entering some very user-specific information or speaking with an operator to complete unscripted tasks. Overall productivity would likely increase if the functional tasks performed using IVR systems could be automated still further. A simple and robust solution is called for that makes IVR systems and customized IVR systems more ubiquitous, easier to develop, and easier to maintain.

SUMMARY OF THE INVENTION

Embodiments of the invention provide a system for an accelerated interactive voice response (IVR). The accelerated IVR system comprises a computerized IVR dialer configured to perform a transaction in one of an automated or semi-automated state by executing a first IVR dialer script on a remote computerized IVR system. The accelerated IVR system also includes a computerized IVR system configured to process transactions from users over a communication link by executing a first IVR system script, wherein the computerized IVR dialer signals the computerized IVR system a request to perform the transaction using a second IVR system script that executes at a higher speed than the first IVR system script.

Embodiments of the invention also provide a method for an accelerated interactive voice response (IVR). The accelerated IVR method comprises performing a transaction in one of an automated or semi-automated state using a computerized IVR dialer that executes a first IVR dialer script on a remote computerized IVR system. The accelerated IVR method also comprises processing transactions from users on a computerized IVR system that executes a first IVR system script and is configured to communicate over a communication link; and signaling by the computerized IVR dialer to the computerized IVR system a request to perform the transaction using a second IVR system script that executes at a higher speed than the first IVR system script.

DETAILED DESCRIPTION OF AN EMBODIMENT OF THE INVENTION

Embodiments of the invention aim to lower port load in interactive voice response (IVR) systems by decreasing the amount of time that customers, or at least certain types of customers spend with the IVR system. Lowering port load on IVR systems could save the companies operating such systems, such as large banks, insurance companies, airlines, and others, substantial sums of money in IVR operational costs and hardware infrastructure utilized.

Embodiments of the invention aim to increase customer satisfaction with IVR systems by improving the speed of IVR transactions and simplifying the user experience. This increased customer satisfaction could in turn increase customer utilization of IVR systems and decrease customer utilization of live agents, again saving companies substantial sums of money.

Embodiments of the invention employ high speed access handshakes for IVR dialers to signal to the IVR system that the caller (e.g., the IVR dialer) is a computer and not a human. Some embodiments of the invention provide high speed IVRs that operate in an autonomous and/or semi-autonomous manner, thus freeing the human beneficiary of the IVR dialer from having to act, or having to take any more than a minimal action, to engage the IVR dialer and verify that the IVR dialer completes its assigned tasks within the IVR system.

IVR dialers are computer programs that automate or partially automate a user's interactions with an IVR system. IVR dialers are particularly helpful on smartphones and computers having softphone applications. Embodiments of the invention may assist in turning user-machine IVR interactions into a simple actuation of a button on a computing system (e.g., pressing an IVR dialer icon on a smartphone as the only human step required to renew a prescription at a pharmacy as opposed to IVR conventional systems that involve telephoning the pharmacy's IVR system and requiring the user to engage with the IVR system over the telephone.)

Mobile platforms, such as smartphones having IVR dialers, are particularly amendable to automated and semi-automated interactions with IVR systems since these mobile devices not only have ready access to an audio communications channel (e.g., a telephone capability), but the typical mobile phone also includes a CPU that has been configured to execute computer programs. Thus, a computer program on the mobile phone, known as an IVR dialer, can be engaged to complete a functional task for the end user on an IVR system (e.g., renewing a drug prescription). Embodiments of the invention aim to complete the task performed by the IVR dialer for the end user without the need for the end user to personally interact with the IVR system.

Thus, an IVR dialer can dial into an IVR system and perform a variety of actions without a human operator having to get involved. For example, an IVR dialer on a mobile platform could be configured to dial into an IVR system, navigate the IVR system's menu, and order a prescription refill without any necessity for the user to interact with the IVR system. In another example, the IVR dialer could phone into a bank's IVR system, navigate the menu to the transfer funds function, retrieve private end user information stored locally on the mobile phone (e.g., bank account number, password, etc.), input that information into the IVR system, transfer funds, and report successful completion of the transfer to the end user.

Of course, the IVR dialers do not necessarily need to operate exclusively on a mobile platform. IVR dialers can operate on any computerized system that also has the ability to establish a communications link with an IVR system. So, for example, a desktop computer having a softphone could use an IVR dialer to interact with an IVR system.

The IVR dialer benefits end users by streamlining and consolidating the navigation of IVR menus. The IVR dialer may even improve the IVR systems themselves by increasing IVR dialer completion rates and giving companies using IVR systems increased control over how their customers' calls are handled. By speeding the rate at which IVR interactions complete, IVR dialers may also significantly reduce port usage by IVR systems. For large IVR system customers like banks or airlines reducing port usage could save the company a significant amount of money.

Embodiments of the invention may also provide IVR operators with greater insight into IVR call traffic by distinguishing between calls made by humans and calls made by automated applications. In some embodiments, the invention may also allow IVR operators to learn which types of applications are calling into their IVR system.

A conventional IVR dialer's operations are based on the menu or script navigated by a human interacting with an IVR system. These conventional components are typically navigated using a series of tones (e.g., DTMF tones), pauses (e.g., to cover instances where the IVR system is providing information to the human user), and possibly voice commands (e.g., to replicate the voice entries provided by a human interacting with an IVR system). The automation of these components comprises the "IVR dialer."

A high speed IVR dialer performs the same tasks as a conventional IVR dialer but accomplishes these tasks on the IVR system at much faster speeds than such tasks are completed using a conventional IVR dialer. By signaling to the IVR system that the IVR dialer does not require human responses, the two computer-controlled devices may then communicate at higher speeds and with greater accuracy, according to an embodiment of the invention.

For example, a high speed IVR dialer designed to run on a computer and communicate with an IVR system to perform the task of checking an end user's account balance at Acme Bank balance might look like this:

a) Enter DTMF tones for "1-800-555-1212" (e.g., Acme Bank's IVR phone number);
b) Set a timer to pause 6 seconds (e.g., while the IVR system says, "Welcome to Acme Bank . . . Press 1 for English . . . .");
c) Enter DTMF tones "4449444" (e.g., an agreed upon code that signals to the IVR system that the caller is a computerized IVR dialer)
d) Receive back from the IVR system the DTMF tones "5559555" (e.g., an agreed upon code that acknowledges from the IVR system that the IVR dialer is a computer and not a human)
e) Enter DTMF tones for "4," for the menu item for "account balance," pause 1 second, enter DTMF tones "44333949" for "customer account," pause 1 second, enter DTMF tones for "321394" for "customer password."
f) Receive from the IVR system DTMF tones corresponding to "349547" (for the balance of $3,495.47) followed by a 1 second pause and then the DTMF tones for "201404171202" (corresponding to "2014-04-17 at 12:02 a.m.");
g) Send the DTMF tone "1100445" for "Acknowledged. Disconnecting;" and
h) Prepare and send a status message to the user containing the user's account balance and time that the balance was computerized (e.g., a text message stating that the user's account balance at Acme Bank was $3,495.47 as of 12:02 a.m. on Apr. 17, 2014).

Embodiments of the invention may enhance the ability of IVR systems to service users over various communications channels, particularly mobile telephony channels. By simplifying the creation of IVR dialers, embodiments of the invention may extend the utility of IVR dialers, particularly on mobile platforms.

In other words, the end user selects an IVR dialer (e.g., an IVR dialer to renew a pharmaceutical prescription at a local pharmacy), and the IVR dialer then interacts with the IVR system automatically without requiring any further action on the end user's part (e.g., select "renew prescription 5"). When the IVR dialer has completed its operations, the user receives a note from the IVR dialer regarding the overall status (e.g., "Prescription renewed; pick up after 5 p.m.").

As discussed above, embodiments of the invention provide a high speed IVR dialer that initiates a "handshake" between the automated IVR dialer and the IVR system to alert the IVR system that the call is under the control of a computerized IVR dialer and to prompt the IVR system to handle the call accordingly, e.g., to give the call a higher speed routing than would be possible in an IVR call that involved humans.

As discussed above, the handshake may be delivered in the form of a sequence of predetermined DTMF tones from the automated IVR dialer to the IVR system, according to an embodiment of the invention. Once the IVR system receives the predetermined DTMF tone sequence, the IVR system completes the handshake by routing the call into a script and/or menu path defined for automated IVR dialer applications. The IVR system also signals acceptance of the high speed IVR request by using a predefined DTMF tone response to the automated IVR dialer that it is capable of handling the higher speed calls, according to an embodiment of the invention.

Figure 1:
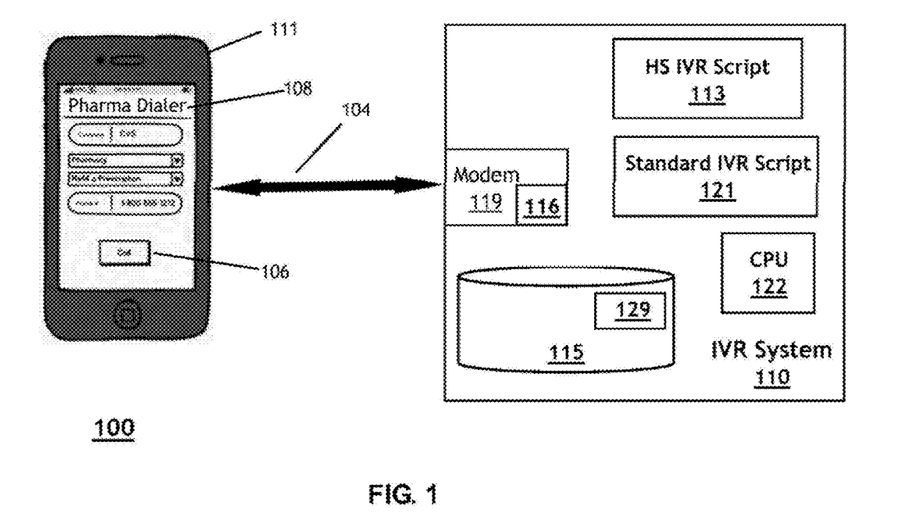
FIG. 1 illustrates an Accelerated IVR System 100 comprising a high speed IVR dialer 108 that uses a mobile phone 111 to engage a communication link 104 with an IVR system 110 configured for accelerated IVR processing, according to an embodiment of the invention.

FIG. 1 illustrates an Accelerated IVR System 100 comprising a high speed IVR dialer 108 that uses a mobile phone 111 to engage a communication link 104 with an IVR system 110 configured for accelerated IVR processing, according to an embodiment of the invention.

Embodiments of the invention give IVR systems the ability to distinguish between IVR calls made by humans and IVR calls made by automated IVR dialers, such as the IVR dialer 108. Companies can therefore gain insight into their customer interactions in order to improve customer relationships and IVR menus and scripts.

Embodiments of the invention also give companies the ability to distinguish between various types of IVR dialers that may be calling into their IVR systems (e.g., Plantronics 401c IVR dialer versus an Apple IVR dialer). Thus, the IVR systems in some embodiments can tailor their responses based on the provenance of the IVR dialer.

Even when a call to an IVR system is contained with the IVR system itself (e.g., the IVR system 110) and is not routed to a human call center operator, the duration of the call itself represents a cost for the IVR system's owner. Previous work by the inventors, and others, has reduced the amount of time spent in an IVR call by automating many parts of the IVR interaction.

Embodiments of the invention further reduce the amount of time spent in an IVR transaction by signaling to the IVR system (e.g., the IVR system 110) that the call has been placed by an automated system (e.g., the IVR dialer 108) capable of communication speeds higher than could be sustained by a human caller.

The mobile phone 111 includes the high speed IVR dialer 108. The high speed IVR dialer 108 operates using the CPU of the mobile phone 111. As shown in FIG. 1, the high speed IVR dialer 108 has been specifically developed to process data related to IVR interactions pertaining to a pharmacy. The high speed dialer 108 could be developed to interact with IVR systems for most applications, according to an embodiment of the invention.

The user engages the high speed IVR dialer 108 by actuating a call button 106 on the mobile phone 111. In some embodiments, the high speed dialer 108 may be configured to engage automatically, e.g., performing the same transaction every week at the same time. The mobile phone 111 includes a CPU (not shown) that can process computer programs, such as the high speed IVR dialer 108. In an alternative embodiment of the invention, the high speed IVR dialer 108 comprises a small electric circuit. In still another embodiment, the mobile phone 111 is replaced by a softphone application operating in a computer, e.g., a laptop computer. In yet another embodiment of the invention, the mobile phone 111 could be replaced with a unified communications system or from a cloud device, such as Twilio, that allows software developers to programmatically make and receive phone calls and send and receive text messages using web service APIs.

Embodiments of the invention build further on efforts to simplify the navigation of IVR systems, such as the IVR system 110, including the provision of private and/or user-specific information to the IVR system. Embodiments of the invention do so by storing user information securely on the mobile phone 111 and on the IVR system in data repository 115, and automating the traversal of IVR menus (e.g., "press 1 for prescription refills," press 2 for filling new prescriptions, press 3 to speak to a pharmacist").

Embodiments of the invention also increase the security of the IVR dialer 108 by confining customer data to the IVR dialer 108 itself without necessity for transmitting this data in public (e.g., reading aloud the security code on a credit card).

The IVR dialer 108 may collect responses from the IVR system 110 indicating the status of the requested action. The status for a requested action can be more precise and presented in a more unified way, according to an embodiment of the invention. For example, otherwise unrelated banks might be able to provide the data in a standardized format. In any event status information produced by the IVR system 111 might include items such as:

Success of the IVR operation,
Failure of the IVR operation,
Task functions such as flight status, account balance, etc.,
Returning to the root menu or to a particular node,
Processing requests by users of the IVR dialer 108, and
Holding for an operator (also including position in the hold queue, time until service).

The IVR dialer 108 can then collect these status updates as DTMF tones and report them back to the user as text or voice responses. For example, the IVR dialer 108 could display to the user information such as:

"Transfer complete,"
"Holding for an operator," and/or
"Call failed. Incorrect PIN code."

The IVR system 110 includes a telephone modem 119 that processes calls, such as the call from the IVR dialer 108 over the communication link 104. The IVR system 110 includes a data repository 115 that includes data 129 related to the user associated with the mobile phone 111. The mobile phone 111 may also contain similar data about the user, e.g., customer data needed for the IVR transaction, such as a password, a user name, etc.

The IVR system 110 has been configured for both high speed IVR calls (e.g., calls conducted with the high speed IVR dialer 108) and conventional IVR calls, according to an embodiment of the invention. A high speed IVR Script 113 has been configured to process high speed IVR calls, and a conventional IVR Script 121 has been configured to handle conventional IVR calls, according to an embodiment of the invention.

The modem 119 includes a high speed IVR call recognition unit 116, according to an embodiment of the invention. The high speed IVR call recognition unit 116 recognizes DTMF tones, among other things, and can identify a high speed IVR call and route the call appropriately within the IVR system to a high speed IVR script. A high speed IVR call is one placed by the high speed IVR dialer 108 and only requires a human in limited circumstances (e.g., interacting with an IVR operator to provide information not known to the high speed IVR dialer). High speed IVR calls uses a high speed recognition tone sent by the IVR dialer 108 over the communication link 104, according to an embodiment of the invention.

When the high speed IVR call recognition unit 116 detects the high speed recognition tone, then the call recognition unit signals the IVR system 110 so that it knows that the inbound IVR caller (e.g., the mobile phone 111) has been placed by a high-speed IVR dialer, such as the high-speed IVR dialer 108, that is capable of engaging in transactions with the IVR system 110 at speeds significantly higher than a human could provide and is also capable of receiving information in formats that differ from those in which a human could exchange information, according to an embodiment of the invention.

The high speed recognition tone could be almost anything previously agreed upon by both the high speed IVR dialer 108 and the IVR system 110, e.g., the DTMF tone for "9991999" provided by the high speed IVR dialer 108 in a 10-second window after the modem 119 accepts the communication link 104, according to an embodiment of the invention. If the recognition tone is not detected by the IVR call recognition unit 116 within a defined time window, the IVR call is determined to be a regular IVR call, and the call is processed by the IVR Script 121, according to an embodiment of the invention.

Once the high speed IVR call recognition unit 116 has detected the high speed recognition tone, then further communications with the high speed IVR dialer 108 are handled by the high speed IVR Script 113, according to an embodiment of the invention.

The high speed IVR call recognition unit 116 sends an acknowledgment to the high speed IVR dialer 108 that the IVR system 110 has received the high speed signal and is configured for high speed operation. By receiving the acknowledgement, the high speed IVR dialer 108 knows that it can use a high speed IVR script rather than a conventional IVR script, according to an embodiment of the invention.

The high speed IVR Script 113 processes communications with the high speed IVR dialer 108 at speeds far greater than could be achieved in a conventional IVR system because the high speed computer-to-computer communication no longer involves a human. Thus, the speed limitation for the IVR call now becomes the top speed of the high speed IVR dialer 108 and its mobile phone 111, the speed of the communication link 104, and the top speed of the high speed IVR Script 113 and its associated computing power (e.g., a CPU).

The high speed IVR Script 113 and the high speed IVR dialer 108 conduct communications over the communication link 104 at speeds limited by their respective processors and the communication link 104 between them, according to an embodiment of the invention. The high speed call, especially once recognized as a high speed call, does not necessarily need to use DTMF tone sequences, but could use any communication protocol that would be operable between the mobile phone 111, the communication link 104, and the high speed IVR Script 113, according to an embodiment of the invention.

Embodiments of the invention also increase the ability of the automated IVR dialer application to provide detailed feedback to the user. Once the high-speed operations have been completed, the end user can receive a detailed report of the transaction that transpired and the status of all items that were processed during the call.

The IVR dialer menu in the high speed script 113 is adjusted (in comparison to conventional IVR dialers) to accept user-identifiable information and route the IVR call based on context collected by the IVR dialer 108. For example, the IVR dialer 108 could prioritize customers or repeat actions (e.g., move $100 each Thursday from checking to savings), according to an embodiment of the invention.

The IVR commercial script used by both the high speed dialer 108 and the high speed script 113 contains significantly shorter pauses between communicated pieces of information than would be the situation with a conventional IVR communication. The IVR script could potentially include no pauses for a recognized high speed transaction, according to an embodiment of the invention. In other words, the high speed IVR dialer 108 could potentially provide the tones of the transaction in one burst—"3-123489-129" where "3" was a DTMF tone corresponding to "prescription refill," "123489" was a customer account number, and "129" was a prescription number on the customer's account, according to an embodiment of the invention. The dashes in the DTMF tone burst above could represent whatever pause was needed, if at all, for the IVR system to appropriately parse the information provided, according to an embodiment of the invention.

The high speed IVR Script 113 could then provide the DTMF tone—"4-3-05-03-1600" where "4" was a DTMF tone corresponding to "refill acknowledged," "3" was a DTMF tone corresponding to "Order ready on," "05-03" was a DTMF tone corresponding to May 5$^{th}$, and "1600" is a DTMF tone corresponding to 4 p.m. The high speed IVR dialer 108 could then reply with the code "2" meaning "acknowledged," and then the communication 104 could be disconnected by either the high speed IVR dialer 108 and/or the IVR system 110, according to an embodiment of the invention. Even using DTMF tones for the communication between the high speed dialer 108 and the high speed script 113 would only take a few seconds of exchanged information in order to complete the transaction, according to an embodiment of the invention.

The communication link 104 in the IVR system 100 does not have be conducted over the plain old telephone system (POTS), although this would be a natural communication channel since it is one typically accessed by customers engaging with IVR systems, such as the target IVR system 110. The communication links either between the mobile phone 111 and the IVR system 119 (e.g., the communication link 104) could operate via other communication channels, such as the Internet or even a series of cables such as USB cables— provided the target IVR system interacted with the IVR creation system 100 in the same manner that it interacts with human customers who access the system 111.

Embodiments of the invention may also increase value for certain types of IVR dialers 108 by increasing security, reducing the likelihood of failure, and increasing the ability of the app to provide detailed feedback to the user.

Figure 2:
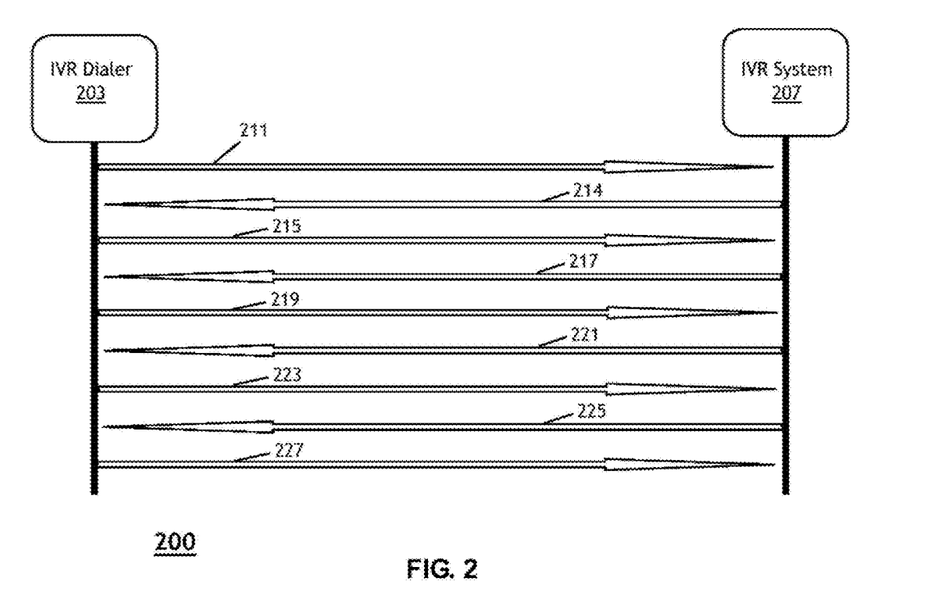
FIG. 2 illustrates a communication diagram 200 that shows communications transacted between a high speed IVR dialer 203 and an IVR system 207 having high speed capabilities, according to an embodiment of the invention.

FIG. 2 illustrates a communication diagram 200 that shows communications transacted between a high speed IVR dialer 203 and an IVR system 207 having high speed capabilities, according to an embodiment of the invention.

The IVR dialer 203 can also initiate another action in response to a status message received from the IVR system 207. If, for example, the IVR system's status changes from "Holding for an operator" to "Operator available," the computerized IVR dialer 203 can then connect the user to a call with an operator (e.g., a human operator) associated with the IVR system 207 and/or a business/organization associated with the IVR system 207.

Conversations between users and IVR systems tend to be in one direction at any time (e.g. either the IVR system 207 is communicating to the user or the user is communicating to the IVR system 207) but not typically in both directions concurrently. After the communication is established between the IVR dialer 203 and the IVR system 207, the conversation conventionally starts with an introductory message from the IVR system 207 to the user (e.g., "Hello and welcome to Spirit Bank and Trust . . . ). In a conventional IVR system, the IVR system 207 eventually sends a message that requests information of some sort from the user and/or the IVR dialer 203.

In a high speed IVR transaction (whether or not the IVR 207 sends the introductory message), the high speed IVR dialer 203 sends a high speed request message 211. The high speed request message 211 could be any communication that unambiguously signals to the IVR system 207 that the IVR dialer 203 can handle high speed transactions, according to an embodiment of the invention. The high speed request message 211 is presumably one that has been mutually agreed upon by the makers of the IVR dialer 203 and the IVR system 207.

The IVR system 207 responds with an acknowledgment message 214 indicating that it is capable of operating at high speeds. The IVR system 207 may not need to send "instructional" messages to the IVR dialer 203 since the IVR system 207 can presume that the IVR dialer 203 understands the IVR system's menu structure, e.g., the IVR system 207 does not need to play messages like "If you would like to refill an existing prescription, press 1."). The IVR system 207 can instead wait for the IVR dialer 203 to provide an indication of the task that it would like to perform, according to an embodiment of the invention. Thus, instead of the IVR system 207 playing the message "If you would like to refill an existing prescription, press 1," the IVR system 207 can instead wait for a message 215 from the IVR dialer 203 that contains the "response" to a non-broadcast transaction request, e.g., the message 215 contains the "response" (e.g., "1") to the question that would have been asked by the IVR system 207 in a conventional IVR conversation. The IVR system 207 then provides an acknowledgment message 217 to the IVR dialer 203, according to an embodiment of the invention.

The IVR system's 207 next conventional message would be to a sub-portion of the menu selected by the user (e.g., "Please enter your CVS pharmacy prescription number). Again, because the IVR system 207 can assume that the IVR dialer 203 knows the IVR system's menu structure, it may await the entry of the requested information (e.g., the prescription number). The IVR dialer 203 provides the response to the unasked prescription number question, e.g., the DTMF tones corresponding to "444555666777"). The IVR system 207 then provides an acknowledgement message 217 to the IVR dialer's response, according to an embodiment of the invention.

The IVR dialer 203 and the IVR system 207 may be constructed so as to use the smallest possible pause between communications with each other—in part because neither component is a human who might need to pause and think about the answer to a question.

The high speed IVR dialer 203 provides the response 219 to the question not asked by the IVR system 207 (e.g., "Please enter the last four digits of the patient's social security number."). Thus, the IVR dialer 203 sends a message 219 containing the tones for "1423", e.g., the patient's social security number. The IVR system 207 sends an acknowledgement message 221 to the IVR dialer 203, according to an embodiment of the invention.

The IVR dialer 203 next sends a message 223 that provides additional information to the order involved in the IVR transaction and following the existing IVR menus. So, the IVR dialer 203 could send a message 223 that indicated a desire to receive the "100 pill count" refill bottle rather than the "50 pill count" bottle.

The IVR system sends an acknowledgement message 225, according to an embodiment of the invention. This particular IVR menu contains no additional information requests, so the IVR system 207 processes the information received by the IVR dialer 203 and determines when the order will be ready. Thus, the acknowledgement message 225 may also include information that can be translated as "Order 4222 ready after 4 p.m. on April 28," according to an embodiment of the invention. The IVR dialer 203 may reformat the message received from the IVR system, as appropriate, and provide the message to the end user, according to an embodiment of the invention.

The IVR dialer 203 sends an acknowledgments message 227 to the IVR system 207. The communication between the IVR dialer 203 and the IVR system 207 then terminates, according to an embodiment of the invention.

Consider, for example, a conventional dialog with an IVR system as a 4 minute-long script. There are points in that script where either the IVR dialer 203 communicates or the IVR system 207 communicates. One can imagine an embodiment of the invention performed in a more robust way. For example, if the IVR dialer 203 provides the response "3" to a given menu item, and the subsequent portion of the script has no options but the further entry of information by the IVR dialer 203, then the IVR dialer 203 could continue to provide the information without the needs for a pause, e.g., providing "2244455" as "32244455" without a pause between the "3" and the "2244455," according to an embodiment of the invention.

If the IVR dialer 203 enters a response that causes a consumer representative for the IVR system 207 to join the call, then the nature of the script between the IVR dialer 203 and the IVR system 207 changes to accommodate the entry of a human into the conversation, e.g., an entity capable only of much slower communication speeds than the high speed IVR dialer 203 and/or the IVR system 207, according to an embodiment of the invention.

The IVR dialer 203 may be constructed to provide a meta-IVR dialer for the IVR system 207 that includes the possibility for completing multiple functional tasks for the user with the IVR system 207, according to an embodiment of the invention.

Figure 3:
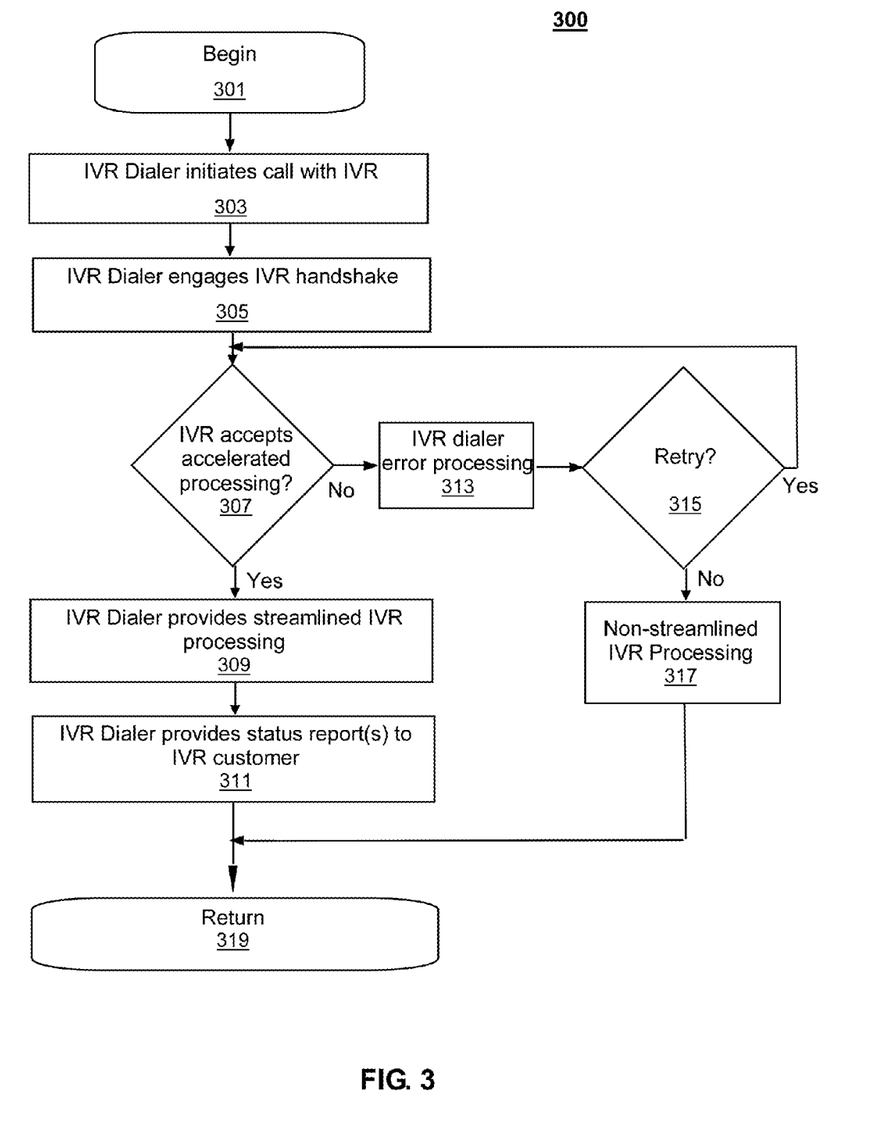
FIG. 3 provides a flowchart 300 that illustrates the process of conducting a high speed IVR transaction between an IVR dialer and an IVR system, according to an embodiment of the invention.

FIG. 3 provides a flowchart 300 that illustrates the process of conducting a high speed IVR transaction between an IVR dialer and an IVR system, according to an embodiment of the invention.

An IVR dialer (e.g., the IVR dialer 108 shown in FIG. 1) initiates 303 a call with an IVR system (e.g., the IVR system 110 shown in FIG. 1), according to an embodiment of the invention.

After the IVR system answers the call from the IVR dialer, the IVR dialer engages the IVR handshake process 305, according to an embodiment of the invention. The high speed IVR dialer provides the high speed access code to the IVR system. As previously discussed, the high speed access code could comprise almost anything. In addition, if the IVR dialer has a high speed IVR script for the IVR system, then this provides an indication that the IVR system has been configured for high speed operations. (Otherwise, the script would not likely have been created and provided to the IVR dialer). However, in some instances, the high speed capability might be offline and/or there may be some other factor that prevents truly high speed operations.

The handshake could also contain an identifier appended to the access code that identifies the manufacturer (e.g., the manufacturer type) of the particular IVR dialing system being used, according to an embodiment of the invention. Assume, for example, that Plantronics offers a mobile app that provides high speed IVR access, as well as some of the company's competitors. It might be useful to IVR owners to know what IVR dialer programs customers are using to dial into their IVR systems. In some embodiments, different menu structures could be deployed for different IVR dialing systems, so as to provide different options, different speed of processing, preferential treatment, and so on.

If the IVR system accepts accelerated processing 307, then the IVR dialer uses a high speed IVR script to provide streamlined 309 IVR call processing between the IVR dialer and the IVR system, according to an embodiment of the invention.

If the automated IVR dialer does not receive the high speed acceptance signal from the IVR system (e.g., a DTMF tone response signaling) that the call has been routed for high speed processing, the automated IVR dialer reacts appropriately. For example, the automated IVR dialer may either try the handshake 307 again, hanging up and retrying, giving up, or traversing the IVR system using the standard path, according to an embodiment of the invention.

If the IVR dialer receives 307 the desired DTMF tone response from the IVR system, the IVR dialer proceeds 309 to accomplish its task using a streamlined menu structure designed just for the IVR dialer. This IVR menu structure uses tones and pauses designed for high speed applications and is optimized to the extent that voice prompts are eliminated and pause durations are minimized. In some instances, pause durations might be eliminated partially or entirely—so long, for example, that the full tone sequence creates no ambiguity in how it's parsed, according to an embodiment of the invention.

If the IVR system does appear to accept accelerated processing 307, then the IVR dialer begins error processing 313, according to an embodiment of the invention. As mentioned previously, the presence of the high speed IVR script is an indication that the IVR system is capable of performing high speed transactions, and thus, the IVR system should acknowledge a request for high speed transactions. The IVR dialer may be configured to retry 315 the high speed handshake 307 by, among other things re-sending the high speed transaction code and waiting to see if the IVR system sends an acknowledgement, according to an embodiment of the invention.

If the IVR dialer does not retry 315 the high speed access code, then the IVR dialer may engage 317 a convention IVR script. Thus, IVR processing would occur in the normal manner.

Embodiments of the invention increase the security of the IVR dialer by requiring authentication of the user and/or IVR dialer at the beginning of the call with the IVR system, according to an embodiment of the invention. IVR systems can change the authentication code and release those changes to approved IVR dialer users, according to an embodiment of the invention. These codes can be distributed during normal IVR calls.

If the high speed IVR script is employed, then the IVR dialer provides 309 streamlined IVR processing, according to an embodiment of the invention. As mentioned previously, the high speed IVR processing may have much smaller pauses and/or no pauses in communications between the IVR dialer and the IVR system, according to an embodiment of the invention.

The IVR dialer provides status reports 311 to the IVR customer once the transaction has been completed. The status reports may take a variety of forms from text message to email message to an on screen approach, according to an embodiment of the invention.

Figure 4:
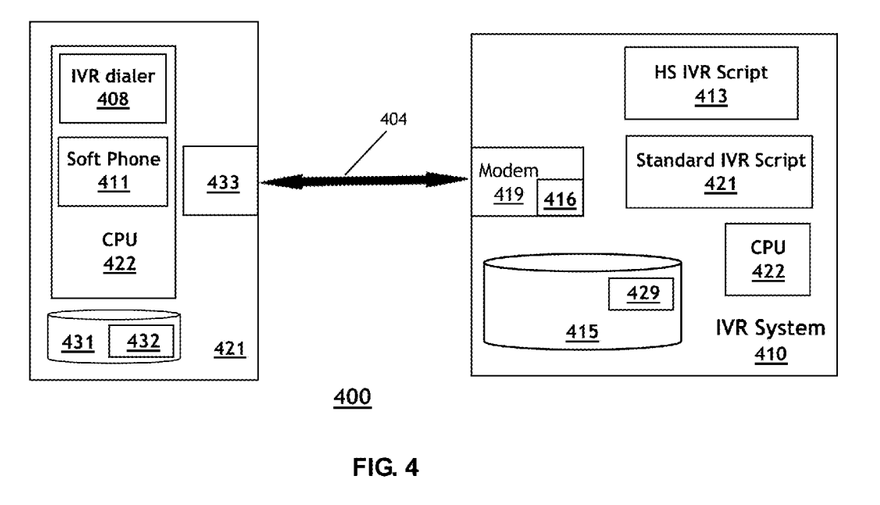
FIG. 4 illustrates an Accelerated IVR System 400 comprising a high speed IVR dialer 408 that uses a softphone 411 in a computer 421 to engage a communication link 404 with an IVR system 410 configured for accelerated IVR processing, according to an embodiment of the invention.

FIG. 4 illustrates an Accelerated IVR System 400 comprising a high speed IVR dialer 408 that uses a softphone 411 in a computer 421 to engage a communication link 404 with an IVR system 410 configured for accelerated IVR processing, according to an embodiment of the invention.

Embodiments of the invention give IVR systems the ability to distinguish between IVR calls made by humans and IVR calls made by automated IVR dialers, such as the IVR dialer 408. Companies can therefore gain insight into their customer interactions in order to improve customer relationships and IVR menus and scripts.

Embodiments of the invention also give companies the ability to distinguish between various types of IVR dialers that may be calling into their IVR systems (e.g., Plantronics 401c IVR dialer versus an Apple dialer IVR dialer), as discussed above. Thus, the IVR systems in some embodiments can tailor their responses based on the provenance of the IVR dialer).

Even when a call to an IVR system is contained with the IVR system itself (e.g., the IVR system 410) and is not routed to a human call center operator, the duration of the call itself represents a cost for the IVR system's owner. Previous work by the inventors, and others, has reduced the amount of time spent in an IVR call by automating many parts of the IVR interaction.

Embodiments of the invention further reduce the amount of time spent in an IVR transaction by signaling to the IVR system (e.g., the IVR system 410) that the call has been placed by an automated system (e.g., the IVR dialer 408) capable of communication speeds higher than could be sustained by a human caller.

The computer 421 includes the softphone 411 and the high speed IVR dialer 408. The high speed IVR dialer 408 operates using the CPU 422 in conjunction with the softphone 411. The high speed dialer 408 could be developed to interact with IVR systems for most applications, according to an embodiment of the invention. For example, the high speed dialer 408 could perform similar prescription renewal functions discussed in conjunction with the high speed dialer 108 shown in FIG. 1.

The user engages the high speed IVR dialer 408 by actuating a calling procedure associated with the soft phone 411. In some embodiments, the high speed dialer 408 may be configured to engage automatically, e.g., performing the same transaction every week at the same time. The soft phone 411 may access the CPU 422.

Embodiments of the invention build further on efforts to simplify the navigation of IVR systems, such as the IVR system 410, including the provision of private and/or user-specific information to the IVR system. Embodiments of the invention do so by storing user information securely on the mobile phone 411 and on the IVR system in data repository 415, and automating the traversal of IVR menus (e.g., "press 1 for prescription refills," press 2 for filling new prescriptions, press 3 to speak to a pharmacist").

Embodiments of the invention also increase the security of the IVR dialer 408 by confining customer data to the IVR dialer 408 itself without necessity for transmitting this data in public (e.g., reading aloud the security code on a credit card).

The IVR dialer 408 may collect responses from the IVR system 410 indicating the status of the requested action. Status information produced by the IVR system 411 might include items such as:

Success of the IVR operation,
Failure of the IVR operation,
Task functions such as flight status, account balance, etc.,
Returning to the root menu or to a particular node,
Processing requests by users of the IVR dialer 408, and
Holding for an operator (also including position in the hold queue, time until service).

The IVR dialer 408 can then collect these status updates as DTMF tones and report them back to the user as text or voice responses. For example, the IVR dialer 408 could display to the user information such as:

"Transfer complete,"
"Holding for an operator," and/or
"Call failed. Incorrect PIN code."

The IVR system 410 includes a telephone modem 419 that processes calls, such as the call from the IVR dialer 408 over the communication link 404. The IVR system 410 includes a data repository 415 that includes data 429 related to the user associated with the mobile phone 411.

The computer 421 also has a data repository 431 that can hold data 432 for the IVR dialer 408, according to an embodiment of the invention. The data 432 may be held securely in a manner such that it is only accessible by the IVR 408, according to an embodiment of the invention. The types of data held in the data 432 may include customer information associated with the user of the IVR 408.

The IVR system 410 has been configured for both high speed IVR calls (e.g., calls conducted with the high speed IVR dialer 408) and conventional IVR calls, according to an embodiment of the invention. A high speed IVR Script 413 has been configured to process high speed IVR calls, and a conventional IVR Script 421 has been configured to handle conventional IVR calls, according to an embodiment of the invention.

The modem 419 includes a high speed IVR call recognition unit 416, according to an embodiment of the invention. The high speed IVR call recognition unit 416 recognizes DTMF tones, among other things, and can identify a high speed IVR call and route the call appropriately within the IVR system to a high speed IVR script. A high speed IVR call is one placed by the high speed IVR dialer 408 and only requires a human in limited circumstances (e.g., interacting with an IVR operator to provide information not known to the high speed IVR dialer). High speed IVR calls uses a high speed recognition tone sent by the IVR dialer 408 over the communication link 404, according to an embodiment of the invention. The computer 421 also has a modem 433 or other communications devices (e.g., a transceiver) for communicating with the IVR system 410, according to an embodiment of the invention.

When the high speed IVR call recognition unit 416 detects the high speed recognition tone, then the call recognition unit signals the IVR system 410 so that it knows that the inbound IVR caller (e.g., the mobile phone 411) has been placed by a high-speed IVR dialer, such as the high-speed IVR dialer 408, that is capable of engaging in transactions with the IVR system 410 at speeds significantly higher than a human could provide and is also capable of receiving information in formats that differ from those in which a human could exchange information, according to an embodiment of the invention.

The high speed recognition tone could be almost anything previously agreed upon by both the high speed IVR dialer 408 and the IVR system 410, e.g., the DTMF tone for "9991999" provided by the high speed IVR dialer 408 in a 10-second window after the modem 419 accepts the communication link 404, according to an embodiment of the invention. If the recognition tone is not detected by the IVR call recognition unit 416 within a defined time window, the IVR call is determined to be a regular IVR call, and the call is processed by the IVR Script 421, according to an embodiment of the invention.

Once the high speed IVR call recognition unit 416 has detected the high speed recognition tone, then further communications with the high speed IVR dialer 408 are handled by the high speed IVR Script 413, according to an embodiment of the invention.

The high speed IVR call recognition unit 416 sends an acknowledgment to the high speed IVR dialer 408 that the IVR system 410 has received the high speed signal and is configured for high speed operation. By receiving the acknowledgement, the high speed IVR dialer 408 knows that it can use a high speed IVR script rather than a conventional IVR script, according to an embodiment of the invention.

The high speed IVR Script 413 processes communications with the high speed IVR dialer 408 at speeds far greater than could be achieved in a conventional IVR system because the high speed computer-to-computer communication no longer involves a human. Thus, the speed limitation for the IVR call now becomes the top speed of the high speed IVR dialer 408 and its mobile phone 411, the speed of the communication link 404, and the top speed of the high speed IVR Script 413 and its associated computing power (e.g., a CPU).

The high speed IVR Script 413 and the high speed IVR dialer 408 conduct communications over the communication link 404 at speeds limited by their respective processors and the communication link 404 between them, according to an embodiment of the invention. The high speed call, especially once recognized as a high speed call, does not necessarily need to use DTMF tone sequences, but could use any communication protocol that would be operable between the soft phone 411, the computer 421, the modem 433, the communication link 404, and the high speed IVR Script 413, according to an embodiment of the invention.

Embodiments of the invention also increase the ability of the automated IVR dialer application to provide detailed feedback to the user. Once the high-speed operations have been completed, the end user can receive a detailed report of the transaction that transpired and the status of all items that were processed during the call.

The IVR dialer menu in the high speed script 413 is adjusted (in comparison to conventional IVR dialers) to accept user-identifiable information and route the IVR call based on context collected by the IVR dialer 408. For example, the IVR dialer 408 could prioritize customers or repeat actions (e.g., move $100 each Thursday from checking to savings), according to an embodiment of the invention.

The IVR commercial script used by both the high speed dialer 408 and the high speed script 413 contains significantly shorter pauses between communicated pieces of information than would be the situation with a conventional IVR communication. The IVR script could potentially include no pauses for a recognized high speed transaction, according to an embodiment of the invention. In other words, the high speed IVR dialer 408 could potentially provide the tones of the transaction in one burst—"3-123489-129" where "3" was a DTMF tone corresponding to "prescription refill," "123489" was a customer account number, and "129" was a prescription number on the customer's account, according to an embodiment of the invention.

The high speed IVR Script 413 could then provide the DTMF tone—"4-3-05-03-1600" where "4" was a DTMF tone corresponding to "refill acknowledged," "3" was a DTMF tone corresponding to "Order ready on," "05-03" was a DTMF tone corresponding to May $5^{th}$, and "1600" is a DTMF tone corresponding to 4 p.m. The high speed IVR dialer 408 could then reply with the code "2" meaning "acknowledged," and then the communication 404 could be disconnected by either the high speed IVR dialer 408 and/or the IVR system 410, according to an embodiment of the invention. Even using DTMF tones for the communication between the high speed dialer 408 and the high speed script 413 would only take a few seconds of exchanged information in order to complete the transaction, according to an embodiment of the invention.

The communication link 404 in the IVR system 400 does not have be conducted over the plain old telephone system (POTS), although this would be a natural communication channel since it is one typically accessed by customers engaging with IVR systems, such as the target IVR system 410. The communication links either between the soft phone 411 and the IVR system 419 (e.g., the communication link 404) could operate via other communication channels, such as the Internet or even a series of cables such as USB cables—provided the target IVR system interacted with the IVR creation system 400 in the same manner that it interacts with human customers who access the system 411.

Embodiments of the invention may also increase value for certain types of IVR dialers 408 by increasing security, reducing the likelihood of failure, and increasing the ability of the app to provide detailed feedback to the user.

Figure 5:
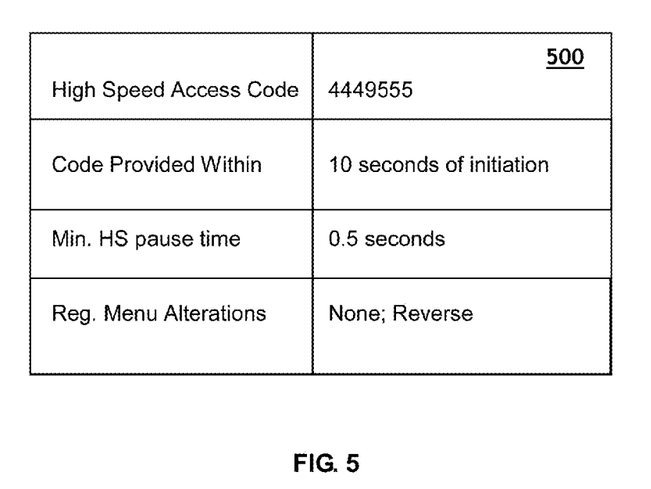
FIG. 5 illustrates a high speed update table 500 that could be provided to an IVR dialer by an IVR system, according to an embodiment of the invention.

FIG. 5 illustrates a high speed update table 500 that could be provided to an IVR dialer by an IVR system, according to an embodiment of the invention. The IVR dialer could use the information provided in the high speed update table 500 to modify a conventional IVR script, according to an embodiment of the invention.

High speed access scripts could be provided to IVR dialers. However, as discussed above, IVR dialers typically need to have access to conventional IVR scripts in case the IVR system is unable to process a high speed IVR call for whatever reason. Thus, one way of manufacturing high speed IVR scripts is to modify a conventional IVR script to turn it into a high speed IVR script.

An IVR dialer, such as the high speed IVR dialer 108 shown in FIG. 1, could receive from the IVR system 410 shown in FIG. 1, the update table 500. Some of the information shown in the update table 500 pertains to the range of equipment used in the IVR system and some of the information pertains to choices that could be done differently, and the overall system would still function properly, according to an embodiment of the invention.

As shown in Table 500, the IVR system has provided the high speed access code as "4449555." Thus, if the IVR dialer entered the code 4449555 when making a call to the IVR system, then the IVR dialer would receive high speed treatment. As discussed above, the number 4449555 is likely provided as a series of DTMF tones; however, the number could be provided in a number of other ways. In addition, the number 4449555 is somewhat arbitrary. However, it does have the advantage in that a human caller to the IVR system is unlikely to accidentally enter the number 4449555 and be presented with the high speed IVR systems and menu.

The Table 500 also provides a time window in which the access code may be entered. As shown in Table 500, the access window opens for the 10 second period after the call is initiated, e.g., after the IVR system answers the call. This number depends upon the physical equipment used by the IVR system. Some IVR systems may need to set longer time windows, while other IVR systems may be able to use shorter windows.

One feature of high speed IVR access is that the pauses between the entry of information can typically be shorter than they are when a human is interacting with the IVR system. As shown in Table 500, the minimum time for a pause is 0.5 seconds. Again, this length of time depends upon the equipment that is being used in the IVR system, and to some extent the equipment that is used in the IVR dialers.

Some high speed IVR dialers may alter the menu structure of a regular IVR menu. Because the IVR dialer already knows the menu structure for the conventional IVR script, the IVR dialer does not need to be re-told how the menu is constructed. On the other hand, in some instances a new menu may be used for the high speed script. As shown in Table 500, this is not the case, here.

Because the automated IVR dialer already knows the menu structure of the IVR script, the IVR dialer does not need to hear the IVR system provide choices and options. These announcements, which consume a great deal of time, can typically be removed, according to an embodiment of the invention. Thus, the flow of conversation between the IVR dialer and the IVR system can be reversed in the high speed access case. In other words, in the conventional IVR system, the IVR dialer waits for the IVR system to provide a choice and then responds with a selection. In the high speed IVR case, the IVR dialer already knows the IVR system's menu, and the IVR system knows that the high speed IVR dialer also knows the IVR system's menu. Thus, the transaction order can be "reversed," as shown in Table 500—with the IVR dialer providing information first, and the IVR system then responding to the menu selections and choices made by the IVR dialer, according to an embodiment of the invention.

When the IVR system delivers Table 500 to the IVR dialer (over a conventional communications media), the Table 500 may not necessarily include the left half of Table 500 as shown in FIG. 5. The Table 500 may include just the information needed and not a human readable description of the invention, according to an embodiment of the invention.

Armed with the information from Table 500, the IVR dialer may then form a high speed IVR script by modifying a corresponding conventional IVR script.

Table 1 below provides a conventional IVR script for refilling a prescription. The "pauses" in the flow of the script represent instances in which the IVR system is providing verbal information to the IVR dialer.

TABLE 1

IVR Dialer Script

| IVR Dialer Action | Comments |
| --- | --- |
| Pause 4 seconds | IVR queries for user's functional task (choices: refill prescription, hear new drug special offers, speak with pharmacist) |
| Enter DTMF tone for "1" | User refills prescription |
| Pause 1 second | IVR queries for pharmacy location ("if pharmacy at 1234 S. Main Street, press 1") |
| Enter DTMF tone for "1" | Corresponds to the location of the pharmacy that the user wishes to use to complete this order |
| Pause 3 seconds | IVR queries for patient social ("please enter the last 4 digits of the patient's social security number") |
| Enter DTMF tone for "2345" | Mark secure: Last 4 digits of user's social security number |
| Pause 5 seconds | IVR queries for prescription ("if refill for omeprazole prescription, press 1 for another other prescription, press 2") |
| Enter DTMF tone for "1" | Refill prescription for omeprazole |

A few additional steps could be added to Table 1, such as terminating the call by the IVR dialer when all tasks have been completed. The IVR dialer could also formulate a message to the end user reporting that the task had been completed, according to an embodiment of the invention.

Combining the information from Table 500 with the calling script provided in Table 1 leads to the high speed IVR script shown in Table 2.

TABLE 2

High Speed IVR Dialer Script

| IVR Dialer Action | Comments |
| --- | --- |
| Call IVR system | |
| Enter DTMF tone for "4449555" | This is the high speed access code provided in Table 500 |
| Pause 0.5 seconds | This is the pause length specified in the Table 500 |
| Enter DTMF tone for "1" | User refills prescription |
| Pause 0.5 second | |
| Enter DTMF tone for "1" | Corresponds to the location of the pharmacy that the user wishes to use to complete this order |
| Pause 0.5 seconds | |
| Enter DTMF tone for "2345" | Mark secure: Last 4 digits of user's social security number |
| Pause 0.5 seconds | |
| Enter DTMF tone for "1" | Refill prescription for omeprazole |

Thus, the high speed IVR dialer shown in Table 2 does not wait for the IVR system to query the IVR dialer for information. The conversation is essentially led by the high speed IVR dialer, according to an embodiment of the invention. The high speed IVR dialer essentially waits 0.5 seconds and then provides additional information.

The high speed IVR dialer 108 shown in FIG. 1 could use the script shown in Table 2 to complete a transaction with the IVR system 111 shown in FIG. 1, according to an embodiment of the invention.

While specific embodiments of the invention have been illustrated and described, it will be clear that the invention is not limited to these embodiments only. Embodiments of the invention discussed herein may have generally implied the use of Plantronics equipment; however, the invention may be adapted for use with equipment from other sources and manufacturers. Equipment used in conjunction with the invention may be configured to operate according to a conventional computer protocol (e.g., USB) and/or may be configured to operate according to a specialized protocol (e.g., a Plantronics serial bus). Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

We claim:

1. An accelerated interactive voice response (IVR) system, comprising:
    a computerized IVR dialer residing on a user device configured to perform a transaction in one of an automated or semi-automated state by executing a first IVR dialer script on the user device that is remote from a computerized IVR system; and
    the computerized IVR system remote from the computerized IVR dialer configured to process transactions from users over a communication link by executing a first IVR system script, wherein the first IVR system script operates at human-accessible speeds,
    wherein prior to execution completion of the first IVR dialer script, the computerized IVR dialer signals the computerized IVR system a request to perform the transaction using a second IVR system script that executes at a higher speed than the first IVR system script wherein the second IVR system script has been optimized for enabling automatic exchange of transaction data between the computerized IVR dialer and the computerized IVR system, and in response to the computerized IVR system accepting the request and changing from the first IVR system script to the second IVR system script, the computerized IVR dialer changes from the first IVR dialer script to a second IVR dialer script, wherein the second IVR dialer script has been optimized for automatic exchange of transaction data between the computerized IVR dialer and the computerized IVR system.

2. The accelerated IVR system of claim 1 wherein the computerized IVR system declines the computerized IVR dialer's request to use the second IVR system script and the computerized IVR dialer completes the transaction on the computerized IVR using the first IVR system script and the first IVR dialer script.

3. The accelerated IVR system of claim 1 wherein the computerized IVR dialer resides in a mobile device and the computerized IVR dialer and the computerized IVR system communicate over a wireless telephony communication link.

4. The accelerated IVR system of claim 1 wherein the computerized IVR dialer resides in a computer having a softphone application and the computerized IVR dialer using the softphone application and the computerized IVR system communicate over a telephony communication link.

5. The accelerated IVR system of claim 1 wherein the computerized IVR dialer accesses a secure data repository holding personal data of an end user associated with the computerized IVR dialer.

6. The accelerated IVR system of claim 1 wherein the computerized IVR system accepts the computerized IVR dialer request and changes from the first IVR system script to the second IVR system script, wherein the second IVR script has a streamlined menu structure in comparison with the first IVR system script.

7. The accelerated IVR system of claim 1 wherein the computerized IVR system provides updates to the first IVR dialer script to the computerized IVR dialer.

8. The accelerated IVR system of claim 1 wherein the computerized IVR dialer prepares a transaction summary and provides the transaction summary to an end user associated with the computerized IVR dialer.

9. The accelerated IVR system of claim 1 wherein the first IVR dialer script requires end user input and the computerized IVR dialer sends a message to the end user requesting the end user to join the transaction with the computerized IVR system.

10. The accelerated IVR system of claim 1 wherein data used to complete the transaction is sent to the computerized IVR system by the IVR dialer using DTMF tones, and wherein the computerized IVR system further comprises a DTMF analyzer.

11. The accelerated IVR system of claim 1 wherein the computerized IVR system notes a manufacturer type of the IVR dialer and retains a record of the noted manufacturer type.

12. The accelerated IVR system of claim 1 wherein the computerized IVR system notes a type for the transaction requested by the computerized IVR dialer and retains a record of the noted transaction type.

13. An accelerated interactive voice response (IVR) method, comprising:
performing a transaction in one of an automated or semi-automated state using a computerized IVR dialer residing on a user device that executes a first IVR dialer script on the user device that is remote from a computerized IVR system;
processing transactions from users on the computerized IVR system remote from the computerized IVR dialer that executes a first IVR system script and is configured to communicate over a communication link wherein the first IVR system script operates at human-accessible speeds;
signaling by the computerized IVR dialer to the computerized IVR system, prior to execution completion of the first IVR dialer script, a request to perform the transaction using a second IVR system script that executes at a higher speed than the first IVR system script and wherein the second IVR system script has been optimized for automatic exchange of transaction data between the computerized IVR dialer and the computerized IVR system;
accepting by the computerized IVR system the computerized IVR dialer request to perform the transaction using the second IVR system script; and changing by the computerized IVR system from the first IVR system script to the second IVR system script and changing, in response to accepting the computerized IVR dialer request, the computerized IVR dialer from the first IVR dialer script to a second IVR dialer script wherein the second IVR dialer script has been optimized for automatic exchange of transaction data between the computerized IVR dialer and the computerized IVR system.

14. The accelerated IVR method of claim 13, further comprising:
declining by the computerized IVR system the computerized IVR dialer's request to use the second IVR system script; and
completing the transaction on the computerized IVR using the first IVR system script and the first IVR dialer script.

15. The accelerated IVR method of claim 13 wherein the computerized IVR dialer resides in a mobile device and the computerized IVR dialer, the method further comprising:
communicating by the computerized IVR system over a wireless telephony communication link with the computerized IVR dialer in the mobile device.

16. The accelerated IVR method of claim 13 wherein the computerized IVR dialer resides in a computer having a softphone application, the method further comprising:
communicating with the computerized IVR system by the computerized IVR dialer using the computerized IVR system.

17. The accelerated IVR method of claim 13, the method further comprising:
accessing by the computerized IVR dialer a secure data repository holding personal data of an end user associated with the computerized IVR dialer.

18. The accelerated IVR method of claim 13, the method further comprising:
accessing by the computerized IVR system a secure data repository holding personal data of an end user associated with the computerized IVR dialer.

19. The accelerated IVR method of claim 13, further comprising:
sending updates to the first IVR dialer script by the computerized IVR system.

20. The accelerated IVR method of claim 13, further comprising:
preparing a transaction summary by the computerized IVR dialer; and
providing the transaction summary to an end user associated with the computerized IVR dialer by the computerized IVR dialer.

21. The accelerated IVR method of claim 13 wherein the first IVR dialer script requires end user input, the method further comprising:
sending a message to the end user by the computerized IVR dialer requesting the end user to join the transaction with the computerized IVR system.

22. The accelerated IVR method of claim 13, further comprising:
sending data used to complete the transaction to the computerized IVR system by the IVR dialer using DTMF tones, wherein the computerized IVR system further comprises a DTMF analyzer.

23. The accelerated IVR method of claim 13, further comprising:
noting by the computerized IVR system a manufacturer type of the IVR dialer; and
retaining a record of the noted manufacturer type by the computerized IVR system.

24. The accelerated IVR method of claim 13, further comprising:
- noting by the computerized IVR system a type for the transaction requested by the computerized IVR dialer; and
- retaining by the computerized IVR system a record of the noted transaction type.

25. The accelerated IVR system of claim 9 wherein the end user provides the required input using one of a voice response or a text response.

26. The accelerated IVR method of claim 21, further comprising:
- receiving the required end user input by the IVR dialer from one of a voice response or a text response.

27. The accelerated IVR system of claim 1 wherein the second IVR system script contains no pauses needed in a human-operated IVR transaction.

28. The accelerated IVR system of claim 13 wherein the second IVR system script contains no pauses needed in a human-operated IVR transaction.

\* \* \* \* \*